United States Patent Office 3,314,851
Patented Apr. 18, 1967

3,314,851
PROCESS FOR REDUCING THE TOXICITY
OF POISONS
Palmer H. Craig, Fort Lauderdale, Fla.
(3200 NE. 6th Drive, Boca Raton, Fla. 33432)
No Drawing. Filed Aug. 30, 1963, Ser. No. 305,834
13 Claims. (Cl. 167—55)

This application is a continuation-in-part of my application, Ser. No. 28,192, filed May 11, 1960 which in turn is a continuation-in-part of my application Ser. No. 685,786, filed Sept. 24, 1957, both of which are now abandoned.

This invention relates to the method of improving insecticidal products and is more particularly directed to the reduction of the toxicity of these poisonous products.

Every insecticide should be not only an effective poison against insects but be as non-toxic as possible to warm-blooded mammals which includes human beings, live stock, pets, etc. The Food and Drug Administration of the U.S. Government will forbid the sale or use of insecticides, pharmaceuticals, medicines, etc., which are unsafe to the user or to anyone coming in contact therewith, except by the use of a proper "poison" label, or by a label setting forth limitations to its dosage or use or making it unavailable except by prescription. The present manner of rending a toxic poison sufficiently non-toxic so as to permit its use is by usually diluting the toxic poison to reduce the degree of toxicity, which in turn reduces the effectiveness of the poison for its intended purpose.

Therefore, ways and means are constantly being investigated for the purpose of reducing the toxicity of toxic materials, which otherwise would not be suitable for human use or by human beings. The present invention contemplates the detoxification of presently produced poisonous materials which are extremely toxic to mammals, and, therefore, too dangerous to be used by the average person in their present condition. This is done by an oxidation process normally including the use of a catalyst and stabilizer, which process results in the lowering of the toxicity of the material to mammals without proportionately diminishing the insecticidal or other poisonous qualities thereof. It has even been found that the insect killing properties of the material processed in accordance with the present invention have in some cases become enhanced.

Many other substances are toxic in varying degree. If their toxicity could be reduced without impairing their primary efficacy, larger and more effective exposure could be obtained.

Due to the general acceptance of parathion as being one of the most effective of the newer insecticides, and also to the fact that parathion is one of the most dangerous of the common insecticides to use because of its extreme toxicity, work was undertaken on the possibility of reducing toxicity, or detoxifying this material, with a complete retention of its insecticidal properties. This work has been quite successful, using the detoxification process described herein. Parathion is so dangerous that its use as an insecticide around the home has been found virtually impractical. It is believed that a fraction of a teaspoonful of the pure material on one's wrist would, if not washed off, cause death within some fifteen minutes.

Therefore, a principal object of the present invention is to provide a simple, inexpensive but extremely effective chemical process for detoxifying a presently toxic but oxidizable poisonous pesticide without lowering its effectiveness to kill the insects for which it is intended.

A further object of the present invention is to render a toxic material less toxic to mammals by a chemical action including the use of an oxidizing agent.

A further object of the present invention is to provide the process for the detoxification of poisonous material, which process includes the use of an oxidizing agent normally used along with a catalyst and a stabilizer.

A still further object of the present invention is to provide a process for the detoxification of poisonous materials which reduces their toxicity but does not materially reduce their poisonous properties for the normal shelf life of the original materials.

Other objects and advantages will appear in the following explanation and description:

I have discovered upon extensive tests that an oxidizable poisonous material which is toxic to mammals can be detoxified to a certain degree upon the oxidizing of the poisonous material. Among the oxidizing agents that I found to be effective are ozone gas ($O_3$) and hydrogen peroxide ($H_2O_2$), though others not mentioned can be used. Along with the oxidizing agent, I normally utilize a catalyst and a stabilizer in the manner described hereinafter.

In the detoxification process utilizing ozone, for example on parathion, I do the following:

Step 1.—I make up a quantity of 1% homogenized parathion with Triton (an emulsifying and anti-foam agent).

Step 2.—I make up a quantity of 1% copper sulfate solution with water. This is the catalyst.

Step 3.—To each 4 liquid or fluid ounces of the 1% parathion of Step 1, I add 2 drops of the copper sulfate solution of Step 2.

Step 4.—I then bubble strong ozone through the above mixture for approximately thirty minutes. The concentration of ozone should be of the order of 4 mg. per liter of air or higher.

Step 5.—I then weigh the resulting mixture and add .2% acetanilid of the total weight of the mixture. If necessary the acetanilid is dissolved in acetone. The acetanilid is the stabilizer.

The resulting product has been found to have about 10% higher insecticidal value. In clinical tests on laboratory test animals, the survival rate of animals treated with the oxidized parathion has been substantially greater than that of animals treated with parathion of commercial grade.

No less effective is the detoxification of parathion with the application of hydrogen peroxide which process is as follows:

Steps 1, 2 and 3 are identical as stated above.

Step 4. Measure the volume of the mixture of Step 3 and add 1% of this volume of 35% concentrated hydrogen peroxide (in water) and incubate for approximately forty-eight hours at about 37° C. while stirring the mixture constantly.

Step 5 the same as above and the mixture is shaken until the stabilizer is completely dissolved.

It is obvious that other soluble copper salts of catalytic activity may be substituted for copper sulfate. Likewise p-hydroxy benzoic acid is useful as an antioxidant.

The following results were obtained in tests for toxicity of parathion, both treated by the detoxifying method and also parathion from the same manufacturer, of the same concentration, given in the same doses, which had not been treated by that method:

Using standard mouse injection methods, and employing CFW mice, the following results were obtained when using an oral injection wherein a length of polyethylene tubing is placed over a hypodermic needle attached to a syringe and inserted into the mouth of the animal. Using treated parathion and a dose of 20 mg. per kg., or 0.4 mg. per 20 gm. mouse, the parathion dissolved in mineral oil, after 30 days, there was 30.8% survival (from the total of 13 mice used for each group) in the group which had been injected with the untreated parathion, whereas there was 84.6% survival in the group injected with the treated parathion, making a net difference of 77.8% inhibition of toxicity in the treated parathion, as compared with the untreated.

Similarly, using intraperitoneal injection, same dosage in mineral oil, but injected into the peritoneal cavity, the following results were obtained: at 30 days—0% survivors in the untreated group, 30.8% survivors in the group receiving treated parathion.

The following results were obtained in tests for the toxicity of thiourea using material both treated by the detoxification method described in the preceding paragraphs and untreated. The treated solution was injected into one lot of mice and the untreated solution into another lot. All of the mice injected with the untreated solution of thiourea died before the fifth day, while all those injected with the same quantity of the same concentration of treated thiourea were alive and well on the fifth day. At the end of a month these mice were sacrificed, dissected and their organs examined and found to be unharmed. Tests were then run on the fungicidal properties of the treated and untreated thiourea solutions, to determine whether these properties had been affected by the treatment. Petri dish cultures of the fungi diplodia natalensis, phomposis citri, and Penicillium digitatum were prepared from cultures of these fungi obtained from the United States Department of Agriculture. The controls showed luxuriant growth but the plates to which both the treated and untreated material was added showed no growth after incubation, indicating no variation in fungicidal properties by treatment.

The following results were obtained in tests for the toxicity of solutions prepared by the extraction of cigarette tobacco. Samples of tobacco treated by the detoxification method described above were labeled A and those untreated were labeled B. Based on gross appearance there was no difference in samples. The samples were placed in small glass jars with metal screw-on caps. A sufficient amount of distilled water was added to each sample to cover the tobacco. The screw cap was replaced and the two samples were kept at room temperature for a period of thirty hours. The extractions were then immediately removed and injected into mice by the intraperitoneal route. Two mice weighing 25 and 26 grams respectively were each given 0.2 ml. of extract diluted with an equal part of distilled water, the extract being taken from original sample A. There were severe symptoms with fine tonic convulsions. However, in 11 to 15 minutes after injection, both mice appeared completely recovered. The same dosage from sample B was injected into two mice each weighing 26 grams. There were tonic and clonic convulsions. Both mice appeared moribund but improved in about 15 minutes and eventually recovered.

In the next experiment the dosage was 0.4 ml.-1:1 dilution. The mice, one weighing 33 grams and one weighing 22 grams were injected with extract from sample A. There were moderately severe symptoms but in spite of discrepancy of weight, both mice recovered. Two mice, one weighing 33 grams and one weighing 23 grams were injected with the same dosage from sample B. One died in 3 minutes and the other in 3½ minutes. In the final experiment two mice give the same dosage taken from sample A recovered and two mice given the same dosage taken from sample B died. It is to be concluded that the detoxification treatment rendered these solutions markedly less toxic.

In another series of experiments tobacco from twenty cigarettes was used. This tobacco was boiled in 200 ml. of distilled water for a period of five minutes. After boiling, the dark brown fluid was decanted and placed in two large centrifuge tubes and centrifuged 15 minutes at 2000 r.p.m. There was obtained 50 ml. of dark brown fluid free of sediment which was divided into two samples, one of which was treated (called sample A) and the other untreated (called sample B). A dosage of 0.5 ml. was given to each of six mice, three receiving solution that was treated (A) and three that was untreated (B). The first three mice receiving treated solution developed mild symptoms but recovered; the second three mice receiving untreated solution immediately developed severe symptoms, two dying within five minutes and the third having convulsions though later recovering. These experiments also indicate the detoxification action of the process described in the above paragraphs. In this case there is a possibility that the extract of the tobacco may contain several toxic ingredients, it seems likely that the principal active agent is nicotine and that the nitrogen atom present in nicotine may act similarly to the nitrogen atoms present in parathion and in thiourea.

The following results were obtained using as starting material powdered *Naja flava* (Cape cobra) venom. It is well known that this poison attacks the nerve cells in mammals, although the chemical formula of the active ingredient has not been determined. The usual procedure was followed of injecting given amounts of the test material in a constant volume of 0.5 ml. intravenously into 20 gram mice. In these experiments CFW mice were used. The initial toxicity of the venom was of the order of 8 to 12 gammas per 20 gram mouse. As a bio-assay end-point the goal was a degree of detoxification that killed half the mice receiving 0.5 ml. of the undiluted material. This is considered complete detoxification since the factor of volume affecting the results enters into the procedure when more than 0.5 ml. is injected intravenously into 20 gram mice. The detoxification method described in the preceding paragraphs rendered the cobra-venom detoxified in less than four minutes, according to the above criterion in more than a dozen experiments.

In still another series of experiments results were obtained in tests for the toxicity of treated and untreated aminothiazole that indicate a similar detoxification effect of the detoxification process described in the preceding paragraphs.

There is convincing evidence to suggest that the detoxification of poisonous compounds by the oxidation process described in the previous paragraphs takes place because the presence of specially active oxygen in the compounds under consideration renders them subject to a destructive degradation by enzymes and similarly acting chemical agents in the blood and tissues of mammals while not having a similar effect when these same compounds are present in the blood and tissues of insects of the type that these compounds are used to destroy. There is a general class of compounds that inhibit the hydrolyzing action of enzymes like acetylcholine-esterase (AChE) that are present in the nerve cells of both mammals and insects. This general class includes a number of the organo-phosphorus insecticides like parathion and malathion. The members of this class have certain common features of chemical structure such as the presence of two specially located types of chemical groups. One of these group types has an electronic structure such that it is somewhat electropositive with respect to the more neutral surrounding atoms. The other is characterized by a chemical bond that is specially subject to the kind of chemical action known as hydrolysis. The cationic or positively charged group must be located structurally at the proper distance from the bond subject to hydrolysis so that the compound is absorbed chemically by the hydrolytic enzyme in a manner that produces hydrolysis and leaves part of the hydrolysis product attached to the enzyme in such a stable association that the enzyme is poisoned and prevented from carrying out its hydrolytic action in a normal way on the natural body products that are involved in the normal physiological function. In other terms, the compound must be a member of the class that possesses a cationic group suitable for attachment to the anionic site of an enzyme like AChE, and possesses a hydrolyzable bond suitable for reaction at the esteratic site on the same enzyme, the cationic group and the hydrolyzable bond being located at a suitable distance apart with suitable structural coupling so that the compound undergoes attachment to the enzyme at both sites at the same time.

For example, it appears from a number of investigations of the process of conduction of nerve impulses in both insects and mammals that a compound called acetylcholine, normally present in the nerve tissue is hydrolyzed by the enzyme AChE, with the products of hydrolysis leaving the enzyme and making it free to produce a subsequent similar reaction with another molecule of substrate like acetylcholine. However, if this enzyme comes in contact with a compound that can be hydrolyzed and can also leave behind an hydrolysis product that is quite firmly bound to the enzyme, then the normal physiological function can be seriously disturbed and death can result if this action is sufficiently wide spread. Such an action occurs with the compound para-oxon. However, the fact that para-oxon is hydrolyzed by acetylcholine-esterase, is an indication of its general susceptibility to hydrolysis; and it is found that para-oxon is subject to hydrolysis by other enzymes normally present in both insect and mammalian tissues and that when introduced into the insect or mammal it is to a large extent destroyed by such action before it can reach the nerve cells where it can affect the passage of nerve impulses and produce lethal action.

By way of contrast, compounds like parathion and malathion that contain sulfur linked to phosphorus have the ability to pass through blood and tissues without having their bonds significantly ruptured by hydrolysis and thus are able to reach the nerve cells intact. There it appears that they undergo oxidation, making them receptive to the hydrolytic process that inhibits the action of the AChE.

The peculiar efficacy of the oxidation process described in the preceding paragraphs is due to an oxidizing action on this class of compounds that are protected by their structure and composition from the hydrolytic action of blood and tissue enzymes. This special oxidation action renders this class of compounds subject to hydrolysis by the enzymes as they pass through the blood and tissues of mammals, a relatively long time of passage, while not making them subject to seriously destructive hydrolysis in the relatively short time of similar passage in insects.

The kind of oxidation process described in the preceding paragraphs thus has a specific novel action and produces a unique and novel utility when applied to the class of compounds described, rendering them far less toxic to mammals while not significantly impairing their toxicity to insects.

To support this explanation of the action of the oxidation process described in the preceeding paragraphs the following evidence from the scientific literature is presented:

There seems to be general agreement that the class of insecticides under consideration are toxic because they disturb the transmission of nerve impulses. The locus of this disturbing action is believed to be in the effector cells at the neuro-muscular junction, but may well include many synapses where the nervous impulse passes from the axon of one neuron to the dendrites of another.

An essential part of the chemistry of the transmission of nerve impulses involves the hydrolysis of acetylcholine by the enzyme AChE. This hydrolysis can be expressed by the reaction:

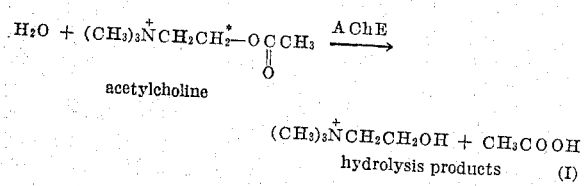

acetylcholine $(CH_3)_3\overset{+}{N}CH_2CH_2OH + CH_3COOH$ hydrolysis products        (I)

As an explanation of this action it has been suggested that on the surface of the AChE complex there are a number of pairs of two kinds of sites. In each pair, one site is anionic having a negative charge; consequently, it is a seat of attraction for positively charged portions of other molecules such as the nitrogen in acetylcholine (see Equation 1). At an exact distance from this anionic site (a distance precisely fixed by the structure of the AChE) there is another kind of site that has a catalytic action promoting the hydrolysis of molecules when these molecules have a hydrolytically susceptible bond that is brought in contact with this site. Such a bond is the one marked with an asterisk in the acetylcholine molecule shown at the left in Equation 1. Thus an enzyme like AChE can have a relatively specific action that hydrolyzes acetylcholine, because the two sites, anionic and esteratic are located at just the precise distance apart to be a "key" that fits the "lock" of acetylcholine and "opens up" the molecule so that it splits apart as shown in Equation 1. The generally accepted hypothesis is that a nerve impulse on approaching the synapse somehow triggers this hydrolysis, with the consequent release of energy that ultimately sets in motion the chain of reactions that can result in neuro-muscular action.

This normal AChE reaction expressed in Equation 1 can be inhibited by two different classes of poisons called (I) reversible or competitive inhibitors, and (II) irreversible inhibitors. Let us consider Class I poisons first. Examples of this class are quarternary ammonium compounds, some amino acids, many alkyl carbamates and methylene blue. If a Class I poison becomes mixed with the acetylcholine near the surface of the enzyme, it competes for the active pairs on the enzyme with the latter. When it makes the critical attachment, it stays on the surface far longer than the acetylcholine before becoming hydrolyzed and thus inhibits normal acetylcholine-AChE action, i.e., disturbs the normal neuro-impulse mechanism. However, the rate of hydrolysis of the Class I poison, although slower than that of acetylcholine, is not many orders of magnitude slower; consequently, if the concentration of the poison is not maintained at the toxic level by diffusion from without, the poison is hydrolyzed within a reasonable length of time and normal neuro-impulse action is restored.

As contrasted with this competitive reaction in which normal neuro-impulse action is restored unless toxic renewal is maintained, there is a quantitatively different type of toxicity produced by poisons in Class II, the irreversible type, of which the most prominent members are the organo-phosphorus insecticides. When a molecule of this class attaches itself to the AChE active site, a far more stable binding probably of the covalent type takes place. As a result the active site may be occupied by the poison and hydrolysis suspended for several days as a consequence of a single contact of the poison of Class II; by contrast the site might be vacated through hydrolysis in several hours after a single contact of a poison of Class I. Thus the covalent bonding of Class II poisons produces lethal action at a far lower concentration.

Kinetically speaking the actions of both classes of poisons are the same from the point of view of dynamic mechanism. Both poisons are able to attack the critical sites because of their resemblance to the normal body molecules that ordinarily occupy those sites. Both poisons are eliminated by the body through the same mechanism that acts on the normal substrate molecule, the acetylcholine. It is only the slower rate of this action on the Class II poisons that make them so lethal.

But this elimination hydrolysis at the surface of the AChE is only part of the body protective mechanism. There is clear evidence that long before the poison reaches the synapse, while it is travelling in the blood or diffusing through the tissue on its way to the critical nerve sites, it undergoes a preliminary attack by other hydrolytic enzymes. Evidence has been found of the presence of such enzymes in the sera of rabbit, rat and horse, where the enzyme will hydrolyze the organo-phosphate poison but is not itself poisoned. An enzyme tabunase has been found in human plasma and tissues that will hydrolyze ethyl dimethylphosphor amidocyanidate and DFP (diethylfluorophosphate), thus stopping the poison before it reaches the nerve. An esterase is found in human erythrocytes and plasma that will hydrolyze aromatic esters of acetic acid but is not affected by relatively high concentrates of DFP or para-oxon. Thus it is clear that in mammals there is a kind of first-line-of-defense that tries to stop these poisons before they reach the sites where their lethal action takes place. This is an example of the "wisdom of the body" propounded by Dr. Walter Cannon. Thus to be effective, a poison molecule must overcome this first-line-of-defense and pass along with its toxicity unimpaired to the critical site where its toxic action takes place.

There is evidence that the most potent inhibitors of cholinesterase in vitro are those that are most easily hydrolyzed under basic conditions. This seems reasonable if the inhibiting reaction is as follows:

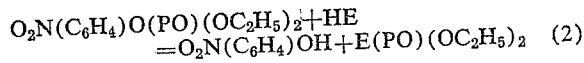

where E represents that part of the enzyme to which the phosphorus atom of the inhibiting group becomes attached.

Next, it is significant to note that the correlation between in vitro cholinesterase inhibition and insect toxicity is in general poor. Thus, one of the best insecticides, parathion, has been shown to be almost inactive as in vitro cholinesterase inhibitor. The suggestion has been made that, during the passage from the entrance into the body to the arrival at the acetylcholinesterase site of the nerve, the phosphorus atom in the parathion is oxidized by a rearrangement as shown below:

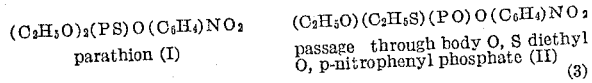

This strongly suggests that the role of the sulfur atom in parathion is to prevent hydrolysis of the organo-phosphorus compound during the greater part of its passage through the body; then just before reaching the active site on the cholinesterase, the sulfur atom yields its place to an oxygen atom, thus converting the compound to a highly active inhibitor that attaches itself to the esteratic site on the cholinesterase, hydrolyzes and leaves the phosphorus atom bonded to the site thus effecting a lethal inhibition. There is considerable evidence to support this view. Parathion incubated with the intact nerve cord of *Periplaneta americana* formed an active inhibitor. Further study showed that this conversion of parathion and a similar conversion of methyl parathion occurred only with intact tissues when oxygen was present and it has been demonstrated that parathion and methyl parathion yield para-oxon and methyl para-oxon respectively when incubated with roach gut. A similar pattern of behavior is found with the insecticide Schradan, where it is the oxidized product that has insecticidal potency.

All this suggests the following explanation for the reduction of toxicity to mammals by the oxidation treatment of an insecticide. First, oxidation may provide potential oxygen, attached at some point to the molecules of the insecticide, that begins to act when the insecticide enters the body. In the case of mammals where the passage through the body to the nerve site takes considerable time, the oxidation action in the body turns the original form of the insecticides into a form which can be attacked by the enzymes in the blood and tissues that hydrolyze it and thus detoxify it. By way of contrast, in the insect body the time of passage is short, and while the added oxygen converts the inactive thio-insecticide to the active oxy-form, there is not sufficient time for the detoxification to take place. Instead the insecticide arrives at the critical site on the AChE in possibly an even more active form than if it had not been treated by the oxidation process. Thus, it is the difference in size of the insect body and the mammalian body, and perhaps the difference in thickness of the coating of the respective nerve sheaths, that may account for the fact that oxidation detoxifies the insecticide with respect to mammals while retaining or even enhancing the toxicity toward insects.

While the above is a reasonable explanation of the mammalian detoxification through oxidation, there are several other possibilities that should be kept in mind:

(1) Oxidation could destroy some compound or compounds that inhibit the action of the enzymes that produce the hydrolysis of the insecticide before it reaches the nerve sites. This is suggested by some of the depotentiation phenomena that have been observed with pairs of insecticides. If detoxification takes place by non-specific enzymes, they may have a greater affinity for an oxidized product.

(2) If diffusion is a process that plays an important part in the passage through the body of the nerve, oxidation with the product of polar sites on the molecule might slow diffusion and thus give the detoxification enzymes a longer time to act in the mammalian body where the path of diffusion should be longer.

(3) Oxidation might change some compound present into an oxygen donor which in turn might transform one of the natural enzymes present into a more potent detoxification agent.

This evidence points clearly to the existence of a class of chemical compounds characterized as follows:

(1) They possess a cationic group having a seat of positive electrical charge, capable of attachment to the anionic site of an enzyme like acetylcholine-esterase;

(2) they possess a hydrolyzable chemical bond capable of association with the esteratic site of the same enzyme referred to above;

(3) the cationic group and the hydrolyzable bond are located the proper distance apart and so coupled structurally that simultaneous attachment of the compound (substrate) and the enzyme takes place with resultant hydrolytic action;

(4) they possess a hydrolyzable part or radical that, after hydrolysis by the enzyme, remains quite firmly bound to the enzyme, thereby inhibiting its normal action;

(5) those containing phosphorus and sulfur possess a structure probably associated with the phosphorus-sulfur bonding that keeps them protected from other hydrolytic enzymes encountered in the normal passage through blood and tissues other than nerve fibres in both animals and insects.

It is on this class of compounds that the oxidation process described in the above paragraphs exerts a novel action, rendering them susceptible to normal hydrolytic degradation and detoxification in the passage through the blood and tissues of mammals, while leaving them capable of passing through the blood and tissues of insects relatively unchanged and thus capable of inhibiting the actions of enzymes in the nerve cells necessary to the sustaining of the life process.

This class of compounds is referred to in the claims as extra-neural hydrolysis-protected nerve enzyme inhibitors. Compounds already identified as belonging to this class include by way of example but not by way of limitation, parathion, methyl parathion, malathion, tetraethyl pyrophosphate, octamethyl pyrophosphoramide, 1,2,3,4,5,6-hexachloro cyclohexane, thioacetamide, 2-amino-thiazole, quinsol, thiourea, dieldrin, heptachlor, 8-hydroxy-quinoline sulfate, diethylene glycol monobutyl ether, dichloro-diphenyl trichloro-ethane, benzene hexachloride, noridrodrine sulfate, methamphetamine hydrochloride, thiopental sodium and aqueous extracts of tobacco.

I claim:

1. The process of reducing mammalian toxicity of a compound selected from the class of chemical compounds characterized as extra-neural hydrolysis-protected acetylcholine-esterase inhibitors, which comprises mildly oxidizing the compound in an aqueous medium in the presence of a small amount of catalyst consisting of a soluble copper salt with an oxidizing agent selected from the class consisting of ozone, $H_2O_2$ and mixtures of such agents with inert diluents and stabilizing the oxidized product with an antioxidant.

2. The process as defined in claim 1 wherein the antioxidant is selected from the class consisting of acetanilid and p-hydroxy benzoic acid.

3. The process defined in claim 2 wherein the antioxidant is acetanilid.

4. The process as defined in claim 1 wherein the oxidizing agent is ozone.

5. The process as defined in claim 1 wherein the oxidizing agent is hydrogen peroxide.

6. The process as defined in claim 1 wherein the toxic substance is selected from the class consisting of parathion, methyl parathion, malathion, tetraethyl pyrophosphate, octamethyl pyrophosphoramide, 1,2,3,4,5,6-hexachloro cyclohexane, thioacetamide, 2-amino-thiazole, quinosol, thiourea, dieldrin, heptachlor, 8-hydroxyquinoline sulfate, diethylene glycol monobutyl ether, dichloro-diphenyl-trichloro-ethane, benzene hexachloride, noridodrine sulfate, methamphetamine hydrochloride, thiopental sodium, and aqueous tobacco extracts.

7. The process as defined in claim 6 wherein the toxic substance is parathion.

8. The process as defined in claim 6 wherein the toxic substance is thiourea.

9. The process as defined in claim 6 wherein the toxic substance is aqueous tobacco extracts.

10. The process of reducing mammalian toxicity of a compound selected from the class of chemical compounds characterized as extra-neural hydrolysis-protected acetylcholine-esterase inhibitors, which comprises the addition of approximately 2 drops of 1% $CuSO_4$ solution to each 4 fluid ounces of the compound, bubbling ozone through the mixture to oxidize it, then adding about 0.2% of acetanilid, based on the weight of the oxidized mixture.

11. The process of reducing mammalian toxicity of a compound selected from the class of chemical compounds characterized as extra-neural hydrolysis-protected acetylcholine-esterase inhibitors,, which comprises the mixing of approximately 2 drops of 1% $CuSO_4$ solution with each 4 fluid ounces of the compound, then adding a quantity of 35% concentrated $H_2O_2$ amounting to 1% of the said mixture, digesting the resulting mixture with stirring to promote oxidation, then adding about 0.2% of acetanilid, based on the weight of the oxidized mixture.

12. The process of reducing mammalian toxicity of a compound selected from the class of chemical compounds characterized as extra-neural hydrolysis-protected acetylcholine-esterase inhibitors, which comprises the addition of approximately 2 drops of 1% $CuSO_4$ solution to each 4 fluid ounces of the compound, bubbling ozone-containing gas having an ozone content of the order of 4 mg./liter through the mixture for about 30 minutes, then adding about 0.2% of acetanilid based on the weight of said oxidized mixture.

13. The process of reducing mammalian toxicity of a compound selected from the class of chemical compounds characterized as extra-neural hydrolysis-protected acetylcholine-esterase inhibitors, which comprises the mixing of approximately 2 drops of 1% $CuSO_4$ solution with each 4 fluid ounces of the compound, then adding about 1% $H_2O_2$ solution containing about 35% $H_2O_2$ digesting the mixture with stirring for about 48 hours at about 37° C. and then adding about 0.2% acetanilid.

References Cited by the Examiner

UNITED STATES PATENTS

| 2,713,018 | 7/1955 | Johnson | 260—461 |
| 2,770,657 | 11/1956 | Wedemeyer | 260—461 |
| 2,879,284 | 3/1959 | Divine et al. | 260—461 |
| 2,980,723 | 4/1961 | Frank et al. | 260—461 |
| 2,981,748 | 4/1961 | Metiver | 260—461 |

OTHER REFERENCES

B.I.O.S. Report No. 1808, p. 9, October 1948.
Chem. Abs., vol. 44; p. 4319 (a), 1950.
Culvendoe, Amine Oxides Reviews, Pure and Applied Chem., vol. 3, 1953 (page 86 relied on).
Degering, Organic Nitrogen Compounds, 1945, University Lithoprinters, Ypsilanti, Michigan (page 460 relied on).
Health, Organophosphorus Poisons, 1961, Pergamon Press, New York (pp. 63 and 71, citing references No. 34 and 36, p. 71 (J. Agric. Food Chem. 6, 28 (1958); J. Assoc. Off. Agric. Chem., Washington, 39, 691 (1956).
Manske, The Alkaloids, 1950, Academic Press Inc., New York (page 238 relied on).
Merck Index, 6th Ed., 1952 (page 6 relied on).

SAM ROSEN, *Primary Examiner.*

JULIAN S. LEVITT, *Examiner.*

N. G. MANN, S. J. FRIEDMAN, *Assistant Examiners.*